United States Patent
Neo et al.

(10) Patent No.: US 8,760,292 B2
(45) Date of Patent: *Jun. 24, 2014

(54) POINT OF SALE TERMINAL HAVING ENHANCED SECURITY

(71) Applicant: Verifone, Inc., San Jose, CA (US)

(72) Inventors: Richard H. H. Neo, Singapore (SG); Mehran Mirkazemi-Moud, Rocklin, CA (US); John Henry Barrowman, Knoxville, TN (US); Christian Eric Schulz, Mission Viejo, CA (US)

(73) Assignee: Verifone, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/717,957

(22) Filed: Dec. 18, 2012

(65) Prior Publication Data

US 2013/0106606 A1 May 2, 2013

Related U.S. Application Data

(63) Continuation of application No. 12/715,794, filed on Mar. 2, 2010, now Pat. No. 8,358,218.

(51) Int. Cl.
*G08B 13/00* (2006.01)

(52) U.S. Cl.
USPC ..... 340/541; 340/539.26; 726/34; 200/61.93; 360/131

(58) Field of Classification Search
USPC .............. 340/539.26, 562, 652, 539.31, 540, 340/541, 635, 657; 726/34–36; 200/61.93; 360/131, 133
See application file for complete search history.

(56) References Cited

U.S. PATENT DOCUMENTS

| | | | |
|---|---|---|---|
| 3,466,643 A | 9/1969 | Moorefield | |
| 3,735,353 A | 5/1973 | Donovan et al. | |
| 3,818,330 A | 6/1974 | Hiroshima et al. | |
| 3,941,964 A * | 3/1976 | Yoder | 200/516 |
| 4,486,637 A | 12/1984 | Chu | |

(Continued)

FOREIGN PATENT DOCUMENTS

| DE | 22 41 738 B | 8/1974 |
|---|---|---|
| DE | 60 101 096 T2 | 7/2004 |

(Continued)

OTHER PUBLICATIONS

U.S. Office Action for corresponding U.S. Appl. No. 11/845,435 dated May 13, 2010.

(Continued)

*Primary Examiner* — George Bugg
*Assistant Examiner* — Edny Labbees
(74) *Attorney, Agent, or Firm* — Sughrue Mion, PLLC

(57) ABSTRACT

A data entry device including a housing formed of at least two portions, data entry circuitry located within the housing, at least one case-open switch assembly operative to sense when the housing is opened and tamper indication circuitry operative to receive an input from the at least one case-open switch assembly and to provide an output indication of possible tampering with the data entry circuitry located within the housing. The at least one case-open switch assembly includes an arrangement of electrical contacts arranged on a base surface and a resiliently deformable conductive element, which defines a short circuit between at least some of the arrangement of electrical contacts only when the housing is closed.

19 Claims, 8 Drawing Sheets

(56) References Cited

U.S. PATENT DOCUMENTS

| | | | |
|---|---|---|---|
| 4,527,030 A | 7/1985 | Oelsch | |
| 4,593,384 A | 6/1986 | Kleijne | |
| 4,749,368 A | 6/1988 | Mouissie | |
| 4,807,284 A | 2/1989 | Kleijne | |
| 4,847,595 A | 7/1989 | Okamoto | |
| 5,086,292 A | 2/1992 | Johnson et al. | |
| 5,237,307 A | 8/1993 | Gritton | |
| 5,239,664 A | 8/1993 | Verrier et al. | |
| 5,353,350 A | 10/1994 | Unsworth et al. | |
| 5,506,566 A | 4/1996 | Oldfield et al. | |
| 5,559,311 A | 9/1996 | Gorbatoff | |
| 5,586,042 A | 12/1996 | Pisau et al. | |
| 5,627,520 A | 5/1997 | Grubbs et al. | |
| 5,675,319 A | 10/1997 | Rivenberg et al. | |
| 5,861,662 A | 1/1999 | Candelore | |
| 5,877,547 A | 3/1999 | Rhelimi | |
| 5,998,858 A | 12/1999 | Little et al. | |
| 6,288,640 B1 | 9/2001 | Gagnon | |
| 6,359,338 B1 | 3/2002 | Takabayashi | |
| 6,396,400 B1 | 5/2002 | Epstein, III et al. | |
| 6,414,884 B1 | 7/2002 | DeFelice et al. | |
| 6,438,825 B1 | 8/2002 | Kuhn | |
| 6,463,263 B1 | 10/2002 | Feilner et al. | |
| 6,466,118 B1 | 10/2002 | Van Zeeland et al. | |
| 6,563,488 B1 | 5/2003 | Rogers et al. | |
| 6,646,565 B1 | 11/2003 | Fu et al. | |
| 6,669,100 B1 | 12/2003 | Rogers et al. | |
| 6,830,182 B2 | 12/2004 | Izuyama | |
| 6,853,093 B2 | 2/2005 | Cohen et al. | |
| 6,874,092 B1 | 3/2005 | Motoyama et al. | |
| 6,912,280 B2 | 6/2005 | Henry | |
| 6,917,299 B2 | 7/2005 | Fu et al. | |
| 6,921,988 B2 | 7/2005 | Moree | |
| 6,936,777 B1 | 8/2005 | Kawakubo | |
| 7,170,409 B2 | 1/2007 | Ehrensvard et al. | |
| 7,270,275 B1 | 9/2007 | Moreland et al. | |
| 7,283,066 B2 | 10/2007 | Shipman | |
| 7,497,378 B2 | 3/2009 | Aviv | |
| 7,528,717 B2 | 5/2009 | Benjelloun et al. | |
| 7,784,691 B2 | 8/2010 | Mirkazemi-Moud et al. | |
| 7,843,339 B2 * | 11/2010 | Kirmayer | 340/562 |
| 7,898,413 B2 * | 3/2011 | Hsu et al. | 340/571 |
| 8,513,548 B2 * | 8/2013 | Rollet et al. | 200/5 A |
| 2004/0031673 A1 | 2/2004 | Levy | |
| 2004/0118670 A1 | 6/2004 | Park et al. | |
| 2004/0120101 A1 | 6/2004 | Cohen et al. | |
| 2005/0081049 A1 | 4/2005 | Nakayama et al. | |
| 2005/0184870 A1 | 8/2005 | Galperin et al. | |
| 2006/0049255 A1 | 3/2006 | von Mueller et al. | |
| 2006/0049256 A1 | 3/2006 | von Mueller et al. | |
| 2006/0192653 A1 | 8/2006 | Atkinson et al. | |
| 2007/0016963 A1 * | 1/2007 | Robinson | 726/34 |
| 2007/0040674 A1 | 2/2007 | Hsu | |
| 2007/0102272 A1 | 5/2007 | Sano et al. | |
| 2007/0152042 A1 | 7/2007 | Mittler | |
| 2007/0204173 A1 | 8/2007 | Kuhn | |
| 2008/0135617 A1 | 6/2008 | Aviv | |
| 2008/0180245 A1 | 7/2008 | Hsu et al. | |
| 2008/0278353 A1 | 11/2008 | Smith et al. | |
| 2009/0058628 A1 | 3/2009 | Kirmayer | |
| 2009/0184850 A1 | 7/2009 | Schulz et al. | |
| 2011/0063109 A1 | 3/2011 | Ostermoller | |
| 2011/0248860 A1 | 10/2011 | Avital et al. | |
| 2011/0279279 A1 * | 11/2011 | Mirkazemi-Moud et al. | 340/635 |
| 2012/0025983 A1 * | 2/2012 | Ben-Zion et al. | 340/541 |
| 2012/0106113 A1 | 5/2012 | Kirmayer | |
| 2012/0180140 A1 * | 7/2012 | Barrowman et al. | 726/34 |

FOREIGN PATENT DOCUMENTS

| | | |
|---|---|---|
| EP | 0375545 A1 | 6/1990 |
| EP | 1421549 A1 | 5/2004 |
| EP | 1432031 A1 | 6/2004 |
| EP | 1676182 A1 | 7/2006 |
| FR | 2 911 000 A1 | 7/2008 |
| GB | 892198 | 3/1962 |
| GB | 1 369 739 | 10/1974 |
| GB | 2 178 235 A | 2/1987 |
| GB | 2 372 363 A | 8/2002 |
| GB | 2 411 756 A | 9/2006 |
| JP | 2003-100169 A | 4/2003 |
| JP | 2004-122002 A | 4/2004 |
| WO | 01/63994 A2 | 8/2001 |
| WO | 03/019467 A1 | 3/2003 |
| WO | 2005/041002 A1 | 5/2005 |
| WO | 2005/086546 A2 | 9/2005 |
| WO | 2009/091394 A1 | 7/2009 |
| WO | 2010/082190 A1 | 7/2010 |

OTHER PUBLICATIONS

International Preliminary Report on Patentability dated Jul. 19, 2011 issued in International application No. PCT/IL2009/000724.
An Office Action dated Oct. 26, 2004, which issued during the prosecution of U.S. Appl. No. 10/326,726.
An Office Action dated May 28, 2004, which issued during the prosecution of U.S. Appl. No. 10/326,726.
An International Search Report and a Written Opinion both dated Apr. 30, 2012, which issued during the prosecution of Applicant's PCT/US2012/020142.
Kremin, et al., "Capacitive sensing—waterproof capacitance sensing", Cypress Perform, Dec. 2006.
Van Ess, Dave; "Capacitive touch switches for automotive applications", http://www.automotivedesignline.com/, Feb. 2006.
An Office Action dated Apr. 10, 2012, which issued during the prosecution of U.S. Appl. No. 12/758,150.
An Office Action dated May 13, 2010, which issued during the prosecution of Applicant's U.S. Appl. No. 11/845,435.
A Notice of Allowance dated Sep. 10, 2010, which issued during the prosecution of Applicant's U.S. Appl. No. 11/845,435.

* cited by examiner

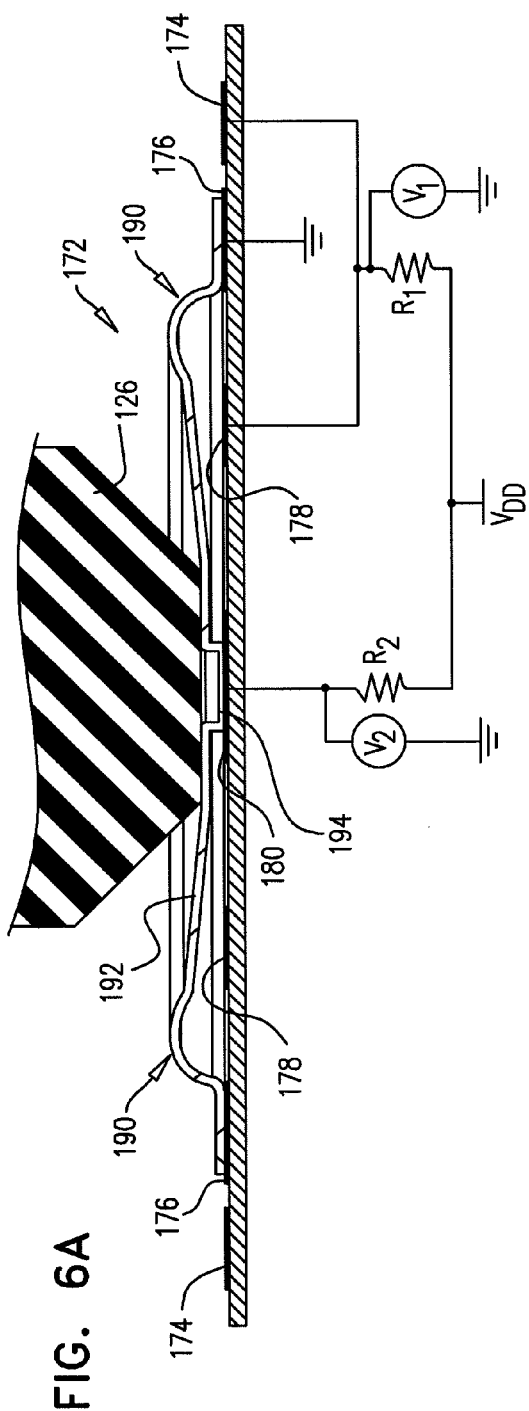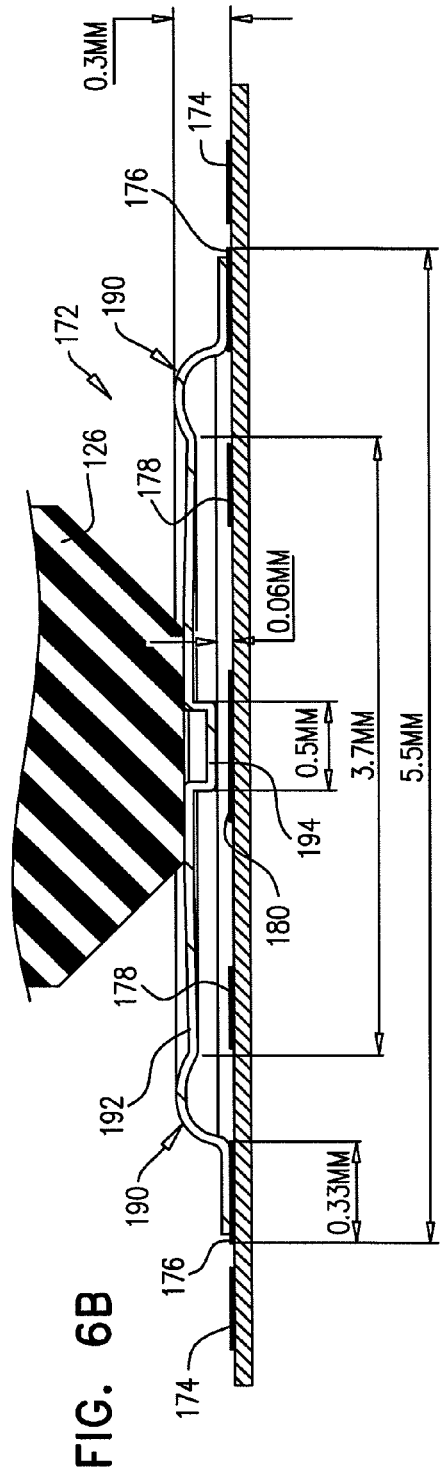

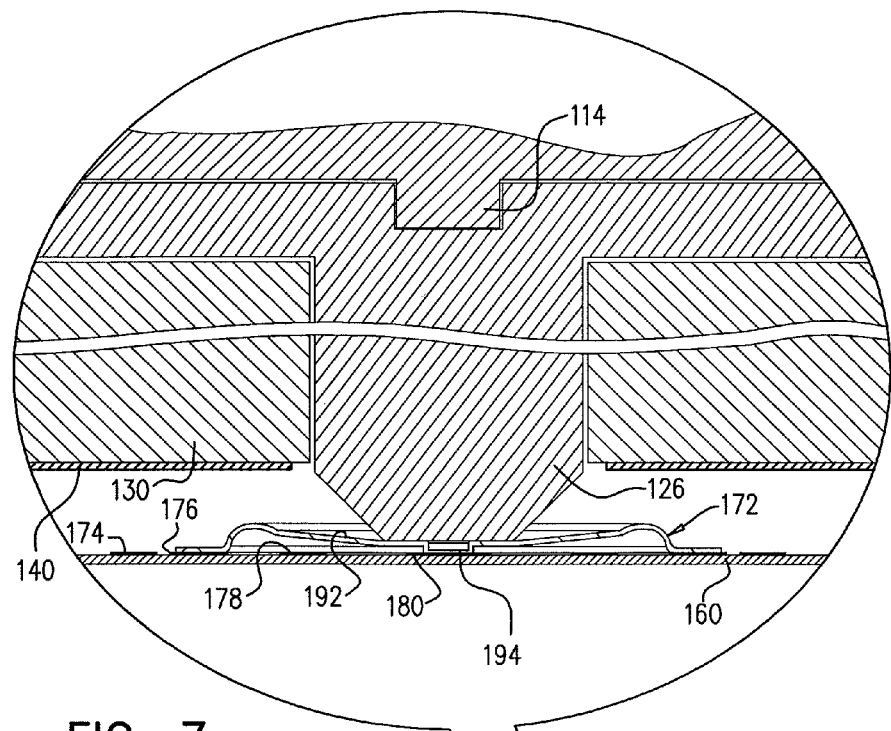
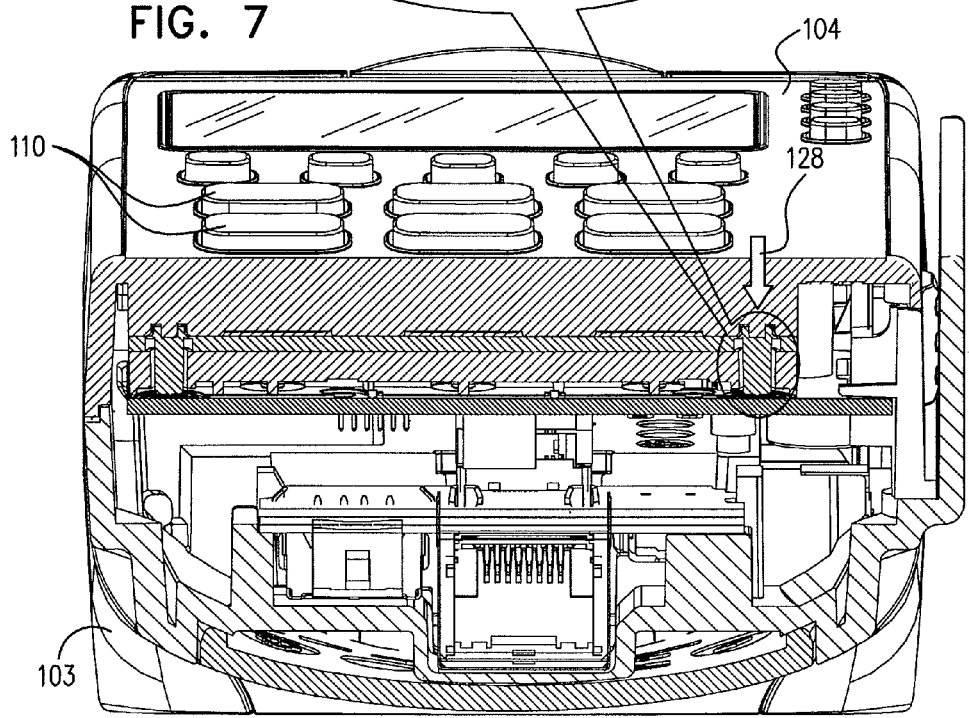
FIG. 7

US 8,760,292 B2

POINT OF SALE TERMINAL HAVING ENHANCED SECURITY

This application is a continuation of U.S. patent application Ser. No. 12/715,394, filed Mar. 2, 2010, entitled "POINT OF SALE TERMINAL HAVING ENHANCED SECURITY", the contents of which are incorporated by reference.

REFERENCE TO RELATED APPLICATIONS

Reference is made to the following patent and patent applications, owned by assignee, the disclosures of which are hereby incorporated by reference, which are believed to relate to subject matter related to the subject matter of the present application:

U.S. Pat. No. 6,853,093; U.S. Published Patent Applications No. 2007/0152042 and 2009/0184850; and U.S. patent application Ser. No. 12/666,054.

FIELD OF THE INVENTION

The present invention relates generally to secure keypad devices and more particularly to data entry devices having anti-tamper functionality.

BACKGROUND OF THE INVENTION

The following U.S. Patent Publications are believed to represent the current state of the art and are hereby incorporated by reference:

U.S. Published Patent Application Nos. 2008/0278353 and 2007/0102272;
U.S. Pat. Nos. 7,270,275; 6,646,565; 6,917,299; 6,936,777; 6,563,488; 5,559,311 and 4,486,637;
European Patent Nos.: 1421549 and 1676182;
Great Britain Patent Application No. GB8608277;
Japanese Patent Application No. JP2003100169;
French Patent Application No. 2911000; and
Published PCT Patent Application No. WO2009/091394.

SUMMARY OF THE INVENTION

The present invention seeks to provide improved secure keypad devices.

There is thus provided in accordance with a preferred embodiment of the present invention a data entry device including a housing formed of at least two portions, data entry circuitry located within the housing, at least one case-open switch assembly operative to sense when the housing is opened and tamper indication circuitry operative to receive an input from the at least one case-open switch assembly and to provide an output indication of possible tampering with the data entry circuitry located within the housing. The at least one case-open switch assembly includes an arrangement of electrical contacts arranged on a base surface and a resiliently deformable conductive element, which defines a short circuit between at least some of the arrangement of electrical contacts only when the housing is closed. The resiliently deformable conductive element includes an at least partially continuous circumferential flange fixed at at least two locations thereat in electrical contact with at least one of the electrical contacts at at least two corresponding locations on the base surface, a circumferential portion having a cross sectional configuration which includes two mutually spaced arches, a central portion disposed in a case-open operative orientation at a first distance from the base surface and a contact portion located interiorly of the central portion and disposed in a case-open operative orientation at a second distance from the base surface, less than the first distance.

Preferably, the arches of the circumferential portion are at least at a distance from the base surface which exceeds the first distance.

In accordance with a preferred embodiment of the present invention the central portion is generally flat. Additionally or alternatively, the contact portion is generally flat.

Preferably, the resiliently deformable conductive element defines a short circuit between some, but not all, of the arrangement of electrical contacts when the housing is closed.

In accordance with a preferred embodiment of the present invention the arrangement of electrical contacts arranged on a base surface includes an outer ring, at least one intermediate ring and a central contact. Additionally, the at least one intermediate ring includes an outer intermediate ring and an inner intermediate ring.

Preferably, the outer intermediate ring is a continuous ring. Alternatively, the outer intermediate ring is divided into plural elements.

In accordance with a preferred embodiment of the present invention the central portion of the resiliently deformable conductive element contacts the central contact when the housing is closed. Additionally, when the central portion of the resiliently deformable conductive element contacts the central contact, the outer intermediate ring is thereby electrically connected with the central contact.

Preferably, when the central portion of the resiliently deformable conductive element contacts the central contact, no part of the resiliently deformable conductive element is in electrical contact with either the outer ring or the inner intermediate ring. Additionally, the outer ring and the inner intermediate ring are both coupled to a voltage VDD via a first resistor, the outer intermediate ring is grounded, and the central contact is coupled to voltage VDD via a second resistor.

In accordance with a preferred embodiment of the present invention the input to the tamper indication circuitry includes an indication of whether the deformable conductive element is simultaneously in contact with both the central contact and the outer intermediate ring. Additionally or alternatively, the input to the tamper indication circuitry includes an indication of whether the inner intermediate ring is short circuited with at least one of the central contact and the outer intermediate ring. Alternatively or additionally, the input to the tamper indication circuitry includes an indication of whether the outer ring is short circuited with the outer intermediate ring.

Preferably, a separation between the contact portion of the resiliently deformable conductive element and the central contact is less than 0.1 mm. Additionally or alternatively, a force required to establish electrical contact between the contact portion of the resiliently deformable conductive element and the central contact is approximately 200 grams.

Preferably, the data entry device also includes an anti-tampering grid, formed of a multiplicity of interconnected anti-tampering electrical conductors in a circuit board associated with the tamper indication circuitry.

There is also provided in accordance with a preferred embodiment of the present invention a case-open switch assembly for a data entry device including a housing, the case-open switch assembly including an arrangement of electrical contacts arranged on a base surface and a resiliently deformable conductive element, which defines a short circuit between at least some of the arrangement of electrical contacts only when the housing is closed. The resiliently deformable conductive element includes an at least partially continuous circumferential flange fixed at at least two locations thereat in electrical contact with at least one of the electrical contacts at at least two corresponding locations on the base surface, a circumferential portion having a cross sectional configuration which includes two mutually spaced arches, a central portion disposed in a case-open operative orientation at a first distance from the base surface and a contact portion located interiorly of the central portion and disposed in a case-open operative orientation at a second distance from the base surface, less than the first distance.

BRIEF DESCRIPTION OF THE DRAWINGS

The present invention will be understood and appreciated more fully from the following detailed description, taken in conjunction with the drawings in which:

FIGS. 6A & 6B are simplified sectional illustrations of the case open switch of FIGS. 4A-5B in respective case closed and case open operative orientations; and FIG. 7 is a simplified sectional illustration, taken along lines VII-VII in FIG. 1C, of a portion of the secure keypad device, including the case open switch in a case closed operative orientation.

DETAILED DESCRIPTION OF PREFERRED EMBODIMENTS

Figure 1A:
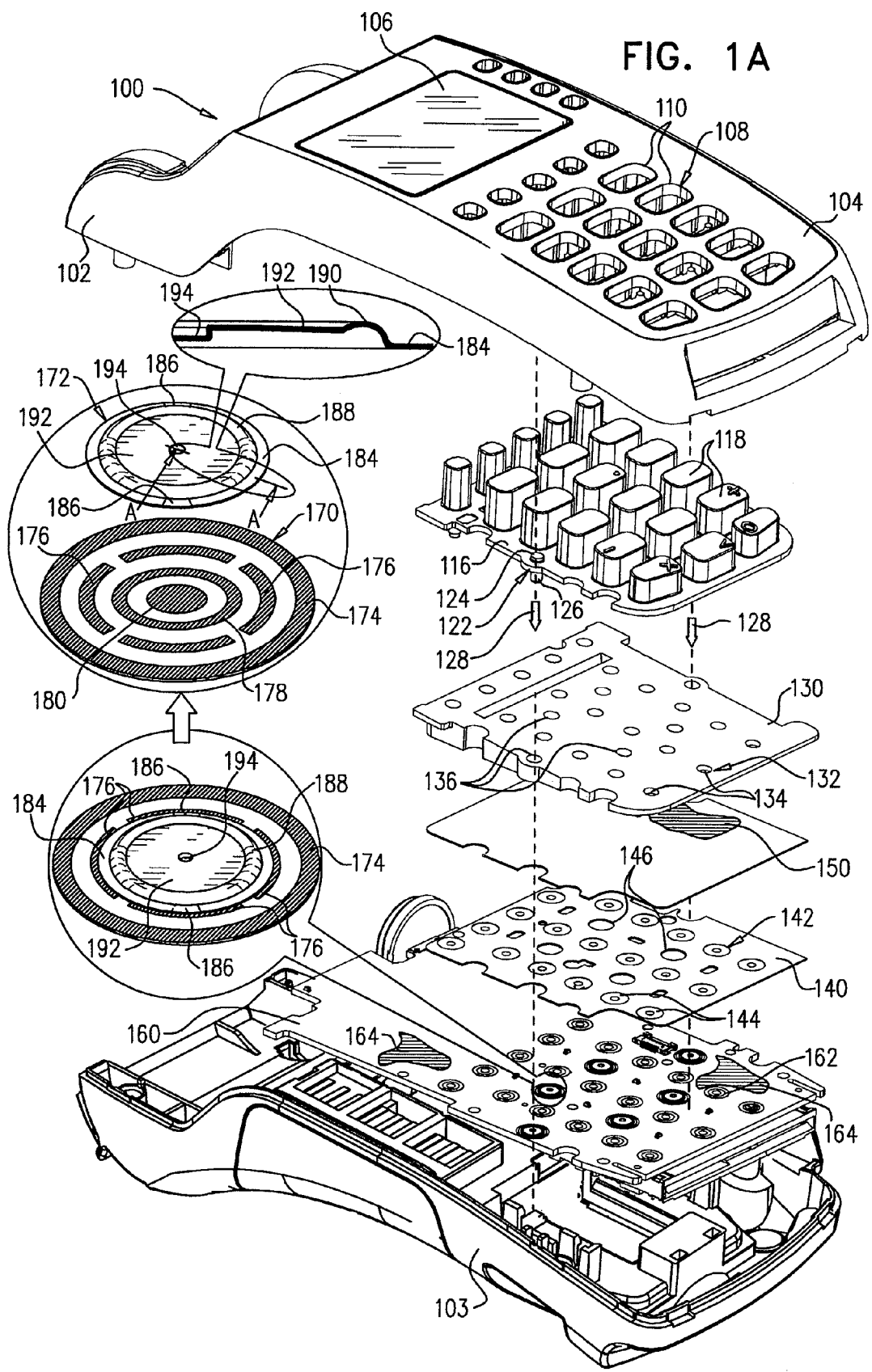
FIGS. 1A and 1B are simplified exploded view illustrations, taken in respective opposite directions, of part of a secure keypad device constructed and operative in accordance with a preferred embodiment of the present invention in a case open operative orientation.

The present invention seeks to provide an improved security system for electronic devices, especially tamper-protected point of sale terminals and other devices containing sensitive information, such as personal data and encryption keys. For the purposes of the present description and claims, the term "point of sale terminals" includes, inter alia, PIN pads, electronic cash registers, ATMs, card payment terminals and the like.

The point of sale terminals preferably include a housing, an anti-tamper protected enclosure located within the housing and adapted to contain the sensitive information, anti-tamper protection circuitry located within the anti-tamper protected enclosure and case open switches electrically coupled to the anti-tamper protection circuitry for protecting against unauthorized access to the interior of the anti-tamper protected enclosure.

Preferably, a confidential data storage element is located within the anti-tamper protected enclosure. Additionally or alternatively a data entry element is also mounted in the housing.

Preferably, the anti-tamper protection circuitry is operative, in the event of unauthorized opening on the housing to perform at least one of the following actions: generate an alarm indication, disable the device and erase the sensitive data.

Reference is now made to FIGS. 1A-5B, which illustrate a secure keypad device constructed and operative in accordance with a preferred embodiment of the present invention.

As seen in FIGS. 1A-5B, there is provided a secure keypad device 100 including a housing element 102 which, together with a back panel 103, defines a keypad device housing. Housing element 102 includes, on a top surface 104 thereof, a display window 106, through which a display (not shown) may be viewed, and an array 108 of key apertures 110.

It is a particular feature of an embodiment of the present invention that the housing element 102 includes on an underside surface 112 thereof a plurality of spaced case open switch actuation protrusions 114.

A resilient key mat 116, preferably formed of a resilient plastic or rubber, defines a plurality of depressible keys 118, preferably integrally formed with the remainder of key mat 116, which partially extend through key apertures 110. Underlying each of keys 118 is a key actuation protrusion 120. Disposed at multiple locations on key mat are case open switch actuation responsive displaceable portions 122, each including a top facing protrusion 124, which is engaged by a corresponding case open switch actuation protrusion 114, and a bottom facing protrusion 126.

It is a particular feature of a preferred embodiment of the present invention that when the housing is closed, case open switch actuation protrusions 114 engage corresponding protrusions 124 and cause displacement of corresponding case open switch actuation responsive displaceable portions 122 in a direction indicated by an arrow 128. Opening of the housing retracts case open switch actuation protrusions 114 from corresponding protrusions 124 and enables displacement of corresponding case open switch actuation responsive displaceable portions 122 in a direction opposite to that indicated by arrow 128 as a result of resilience of the case open switch actuation responsive displaceable portions 122 and key mat 116.

Underlying key mat 116 is a light guide element 130 which includes an array 132 of apertures 134 which accommodate key actuation protrusions 120. It is a particular feature of a preferred embodiment of the present invention that light guide element 130 also includes a plurality of apertures 136, which accommodate bottom facing protrusions 126 of case open switch actuation responsive displaceable portions 122.

Underlying light guide element 130 and preferably adhered to an underside surface thereof is a key contact layer 140. Key contact layer 140 preferably includes an array 142 of raised resilient conductive domes 144, such as those commercially available from Snaptron, Inc. of Windsor, Colo., USA. It is a particular feature of an embodiment of the present invention that key contact layer 140 also includes a plurality of apertures 146 which accommodate bottom facing protrusions 126 of case open switch actuation responsive displaceable portions 122, particularly when displaced in the direction of arrow 128, when the housing is closed.

An anti-tampering grid 150, formed of a multiplicity of interconnected anti-tampering electrical conductors in a flexible printed circuit board (PCB) is optionally provided between the light guide element 130 and the key contact layer 140.

Underlying key contact layer 140 is an electrical circuit board 160, which functions, inter alia, as a key contact pad board, defining a plurality of pairs of adjacent electrical contact pads 162, each pair underlying a corresponding dome 144, preferably made of carbon, metal or combination of carbon/metal. The arrangement of key contact layer 140 and of electrical circuit board 160 is such that depression of a key 118 by the finger of a user causes dome 144 to establish electrical contact with and between a corresponding pair of electrical contact pads 162 lying thereunder and in registration therewith. When key 118 is not depressed, no electrical contact exists between dome 144 and a pair of corresponding electrical contact pads 162 or between the adjacent pads of the pair.

Electrical circuit board 160 preferably includes an anti-tampering grid 164 formed of a multiplicity of interconnected anti-tampering electrical conductors. The anti-tampering grids 150 and 164 are coupled to anti-tampering detection circuitry 166.

In accordance with a preferred embodiment of the present invention, case-open switches, which sense physical tampering and opening of the housing, are provided, each preferably including the following structure:

an arrangement of electrical contacts 170 arranged on a base surface, preferably electrical circuit board 160, and a resiliently deformable conductive element 172, which defines a short circuit between at least some of said arrangement of electrical contacts 170 only when said housing is closed.

The arrangement of electrical contacts 170 preferably includes an outer ring 174, an optionally quartered outer intermediate ring 176, an inner intermediate ring 178, and a central contact 180. It is appreciated that outer intermediate ring 176 may be a continuous ring or may be divided into any number of elements.

It is a particular feature of an embodiment of the present invention that the resiliently deformable conductive element 172 includes an at least partially continuous circumferential flange 184 fixed at at least two locations 186 thereat in electrical contact with at least two quadrants of outer intermediate ring 176, a circumferential portion 188 having a cross sectional configuration which includes two mutually spaced arches 190 (as seen in FIGS. 6A and 6B), a central portion 192 disposed in a case-open operative orientaion at a first distance from the base surface; and a contact portion 194 located interiorly of the central portion and disposed in a case-open operative orientation at a second distance from the base surface, less than the first distance.

When the housing is opened by at least approximately 0.75 mm, one or more of the plurality of spaced case open switch actuation protrusions 114 is retracted from one or more corresponding top facing protrusions 124 of one or more case open switch actuation responsive displaceable portions 122, whose resilience causes corresponding retraction of one or more bottom facing protrusions 126, whose retraction reduces the pressure on one or more central portion 192 of one or more resiliently deformable conductive elements 172. This results in at least one contact portion 194 becoming separated from a corresponding contact 180.

Figure 1B:
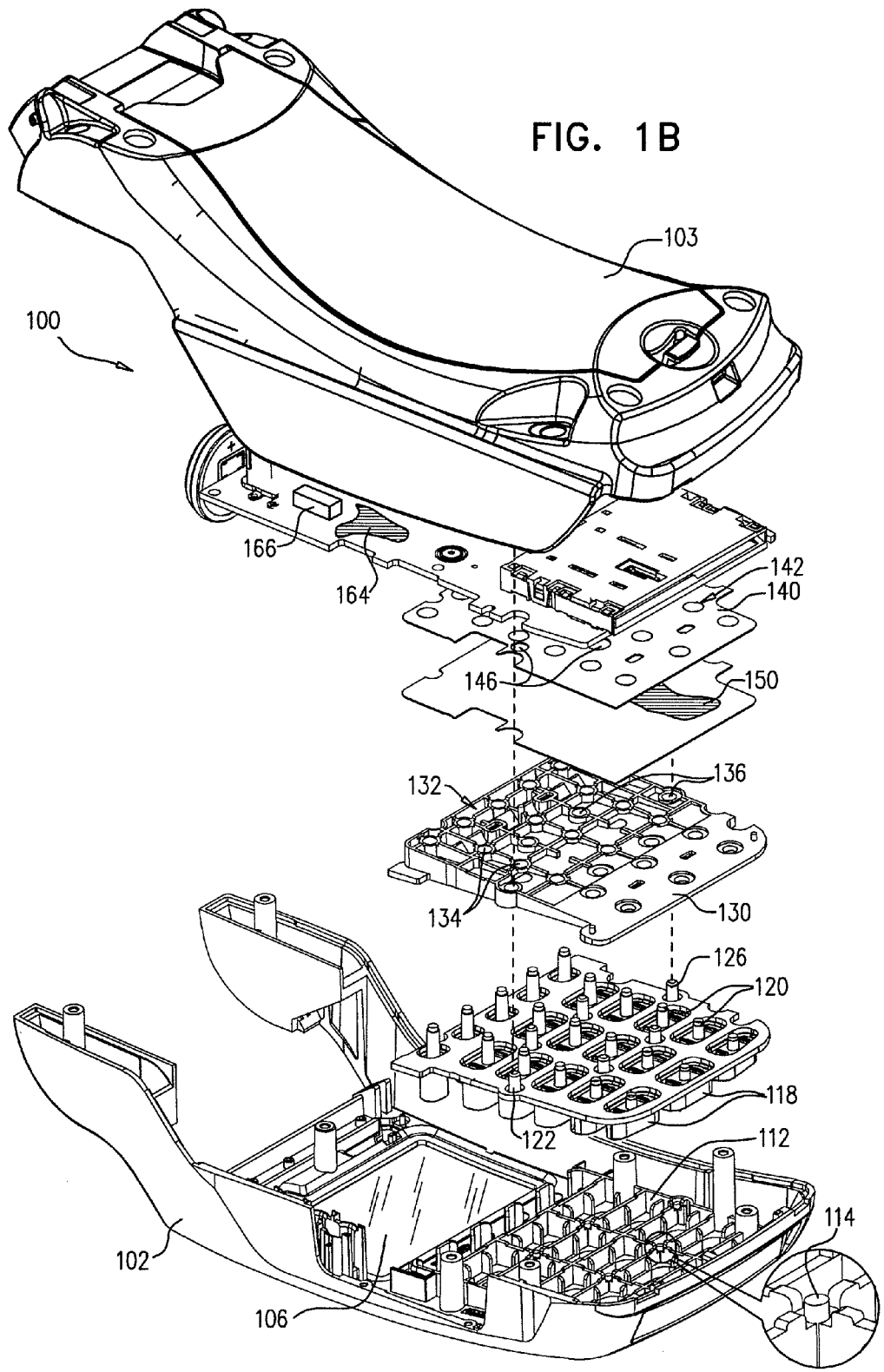
Figure 1C:
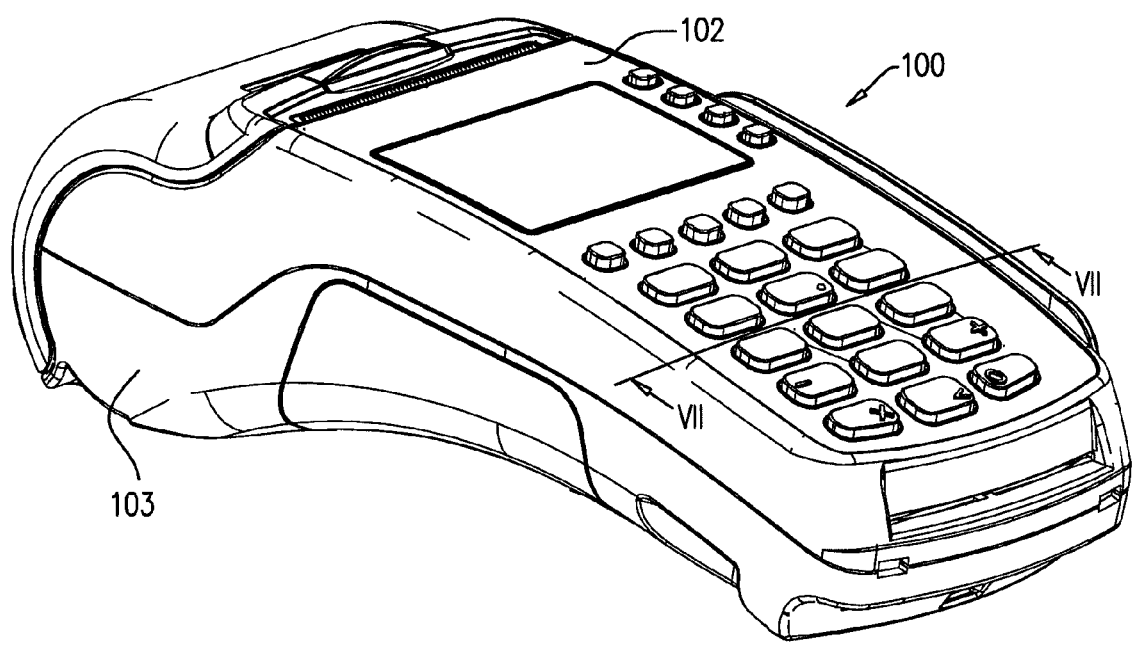
FIG. 1C is a simplified illustration of the secure keypad device of FIGS. 1A and 1B in a case closed operative orientation.
Figure 2:
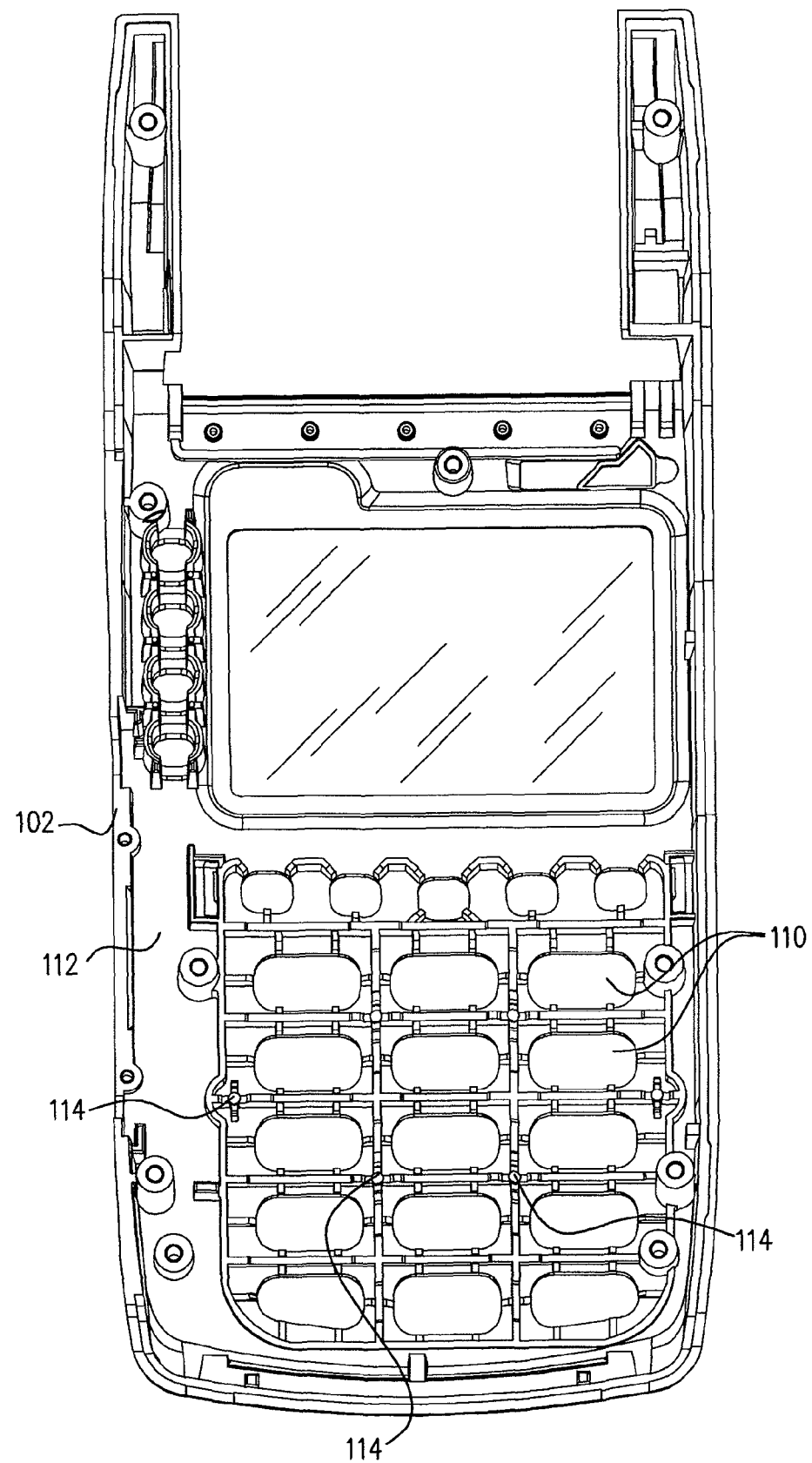
FIG. 2 is a simplified planar illustration of the interior of a portion of the housing of the secure keypad device illustrated in FIGS. 1A-1C.
Figure 3A:
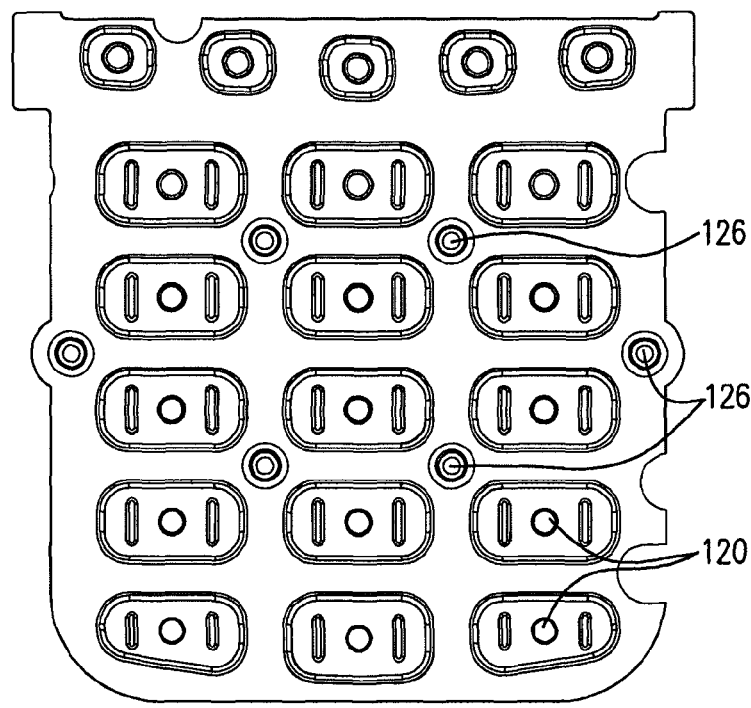
FIGS. 3A & 3B are simplified planar illustrations, taken in respective opposite directions, of a keypad portion of the secure keypad device illustrated in FIGS. 1A-2.
Figure 3B:
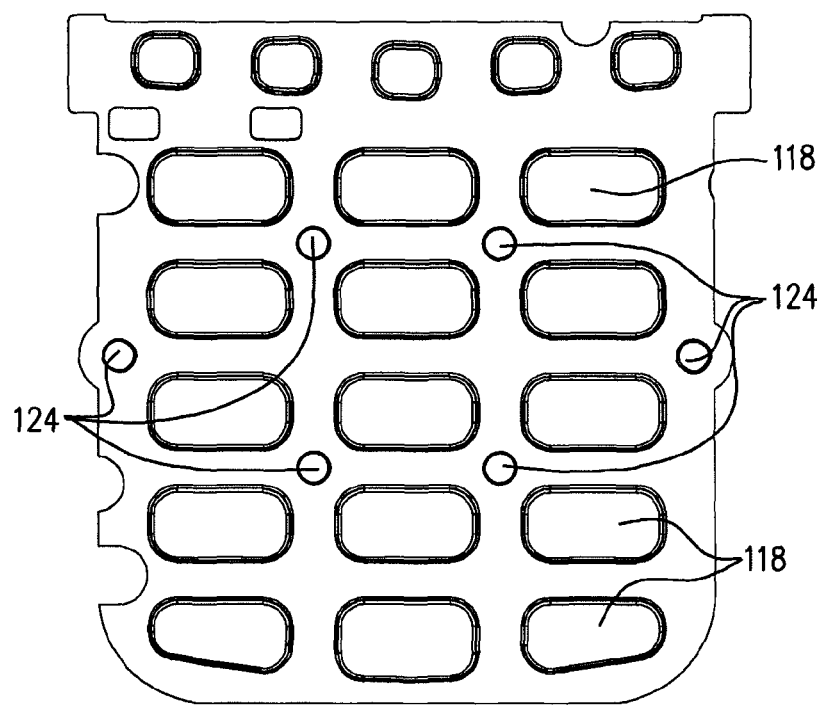
Figure 4A:
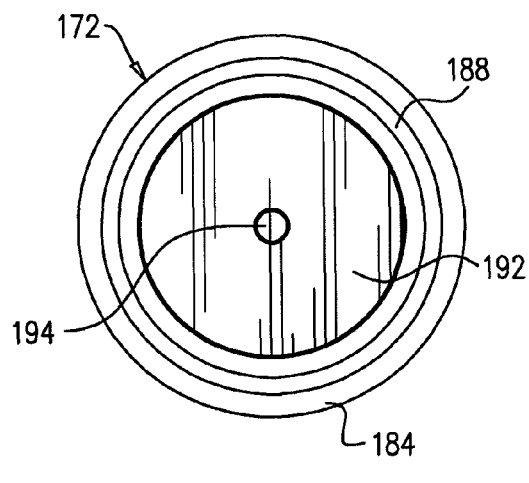
FIGS. 4A & 4B are simplified planar illustrations, taken in respective opposite directions, of a case open switch forming part of the secure keypad device illustrated in FIGS. 1A-3B.
Figure 4B:
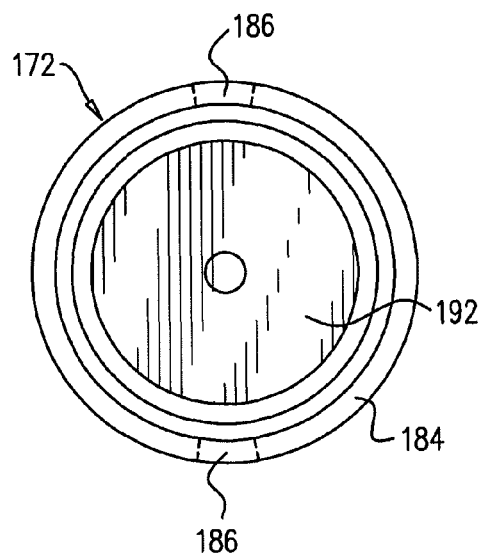
Figure 5A:
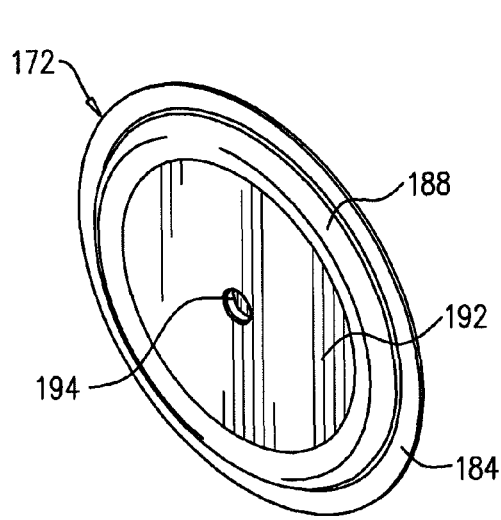
FIGS. 5A & 5B are simplified pictorial illustrations, taken in respective opposite directions, of the case open switch of FIGS. 4A & 4B.
Figure 5B:
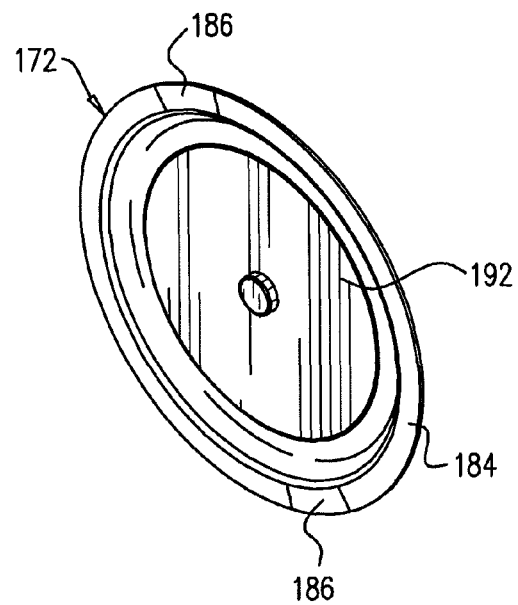

Reference is now made to FIGS. 6A and 6B, which are simplified sectional illustrations of the case open switch of FIGS. 4A-5B in respective case closed and case open operative orientations, and to FIG. 7, which is a detailed sectional illustration of secure keypad device, including the case open switch, in a case closed operative orientation. For simplicity, FIGS. 6A-7 do not include the optional anti-tampering grid 150 (FIGS. 1A & 1B).

As seen generally in FIG. 7 and with greater specificity in FIG. 6A, when the housing is in a case closed operative orientation, case open switch actuation protrusions 114 (FIGS. 1B & 2) engage corresponding protrusions 124 (FIG. 1A) and cause displacement of corresponding case open switch actuation responsive displaceable portions 122 (FIGS. 1A & 1B) in the direction indicated by arrow 128. As a result, bottom facing protrusions 126 of case open switch actuation responsive displaceable portions 122 are in pressure contact with central portion 192 of resiliently deformable conductive element 172.

This pressure contact displaces the central portion 192 downwardly in the direction of arrow 128 such that contact portion 194 of resiliently deformable conductive element 172 is in touching and electrical contact with central contact 180, thus electrically connecting outer intermediate ring 176 with central contact 180. It is noted that due to the particular configuration and construction of resiliently deformable conductive element 172, no part of resiliently deformable conductive element 172 is in electrical contact with either of rings 174 and 178.

As seen in FIG. 6A, outer ring 174 and inner intermediate ring 178 are both coupled to a voltage VDD via a resistor $R_1$, outer intermediate ring 176 is grounded and central contact 180 is coupled to voltage VDD via a resistor $R_2$. A voltage $V_2$ may be measured to indicate whether the housing is open or closed, i.e. whether or not deformable conductive element 172 is simultaneously in contact with both central contact 180 and outer intermediate ring 176. When deformable conductive element 172 is simultaneously in contact with both central contact 180 and outer intermediate ring 176, $V_2$ is zero. Otherwise $V_2$ equals VDD.

An attempt to tamper with the case open switch by short circuiting central contact 180 and outer intermediate ring 176 will also short circuit inner intermediate ring 178 with contact 180 and/or outer intermediate ring 176 or short circuit outer ring 174 with outer intermediate ring 176 and may be detected by measuring a voltage $V_1$. During normal operation, where no tampering is detected, $V_1$ is equal to VDD. An attempt to tamper with the case open switch causes voltage $V_1$ to be zero.

Anti-tampering circuitry 166 (FIG. 1B) preferably is operative to measure voltages $V_1$ and $V_2$ and to provide tampering alarms and responses accordingly. Optional anti tampering grids 150 and 164 may also be coupled to anti tampering circuitry 166.

Attempts to tamper with the case open switch, as by applying conductive adhesive under resiliently deformable conductive element 172 or insertion of a conductive element under resiliently deformable conductive element 172 may be made in order to establish an electrical connection between ring 176 and contact 180 even when the housing is open.

Such attempts to tamper can be expected to result in establishment of an electrical connection between the resiliently deformable conductive element 172, rings 176 and central contact 180 on the one hand and at least one of rings 174 and 178, thus producing an alarm.

It is a particular feature of the present invention that the required displacement of resiliently deformable conductive element 172 along arrow 128 into a case closed operative orientation is relatively small. This may be seen by reference to FIG. 6B, which indicates that the separation between the contact portion 194 of resiliently deformable conductive element 172 and contact 180 in the direction indicated along arrow 128 is preferably 0.06 mm. It is also seen in FIG. 6B that the distance between the top of the circumferential portion 188 to the bottom of flange 184 is preferably 0.3 mm, the diameter of the central portion 192 is preferably 3.7 mm and the diameter of the contact portion 194 is preferably 0.50 mm. The overall diameter of the resiliently deformable conductive element 172 is preferably 5.50 mm and the radial extent of flange 184 is 0.33 mm.

Additionally, circumferential flange 184 preferably is attached by soldering thereof, at discrete locations 186 therealong, to outer intermediate ring 176 and the provision of circumferential portion 188 having a cross sectional configuration which includes two mutually spaced arches 190 reduces the amount of force required to displace contact portion 194 into electrical contact with contact 180. Preferably the required force is about 200 grams.

Furthermore, the angular displacement of resiliently deformable conductive element 172 between case open and case closed operative orientations is small, resulting in high reliability of reversion to a case open orientation when the housing is opened, even after having been closed for a long time.

The above features make attempts to tamper difficult.

It is appreciated by persons skilled in the art that the present invention is not limited by what has been particularly shown and described hereinabove. Rather the scope of the present invention includes both combinations and subcombinations of various features described hereinabove as well as variations and modifications thereto which would occur to a person of skill in the art upon reading the above description and which are not in the prior art.

The invention claimed is:

1. A data entry device comprising:
a housing formed of at least two portions;
data entry circuitry located within said housing;
at least one case-open switch assembly operative to sense when said housing is opened; and
tamper indication circuitry operative to receive an input from said at least one case-open switch assembly and to provide an output indication of possible tampering with said data entry circuitry located within said housing,
said at least one case-open switch assembly including:
an arrangement of electrical contacts arranged on a base surface, said arrangement of electrical contacts including an outer ring contact, at least one intermediate ring contact, and a central contact, at least one of said outer ring contact and said at least one intermediate ring contact being an anti-tampering contact and being coupled to said tamper indication circuitry; and
a resiliently deformable conductive element, which defines a short circuit between said central contact and said at least one intermediate ring contact only when said housing is closed,
said resiliently deformable conductive element comprising:
an at least partially continuous circumferential flange fixed in electrical contact with said at least one intermediate ring contact;
a circumferential portion having a cross sectional configuration which includes two mutually spaced arches;
a central portion disposed in a case-open operative orientation at a first distance from said base surface; and
a contact portion located interiorly of said central portion and disposed in a case-open operative orientation at a second distance from said base surface, less than said first distance, and in a non-case open operative orientation touching said central contact.

2. The data entry device according to claim 1 and wherein said arches of said circumferential portion are at least at a distance from said base surface which exceeds said first distance.

3. The data entry device according to claim 1 and wherein said central portion is generally flat.

4. The data entry device according to claim 1 and wherein said contact portion is generally flat.

5. The data entry device according to claim 1 and wherein said at least one intermediate ring contact includes at least one outer intermediate ring contact and an inner intermediate ring contact.

6. The data entry device according to claim 5 and wherein said input to said tamper indication circuitry includes an indication of whether said inner intermediate ring contact is short circuited with at least one of said central contact and said at least one intermediate ring contact.

7. The data entry device according to claim 5 and wherein said at least one outer intermediate ring contact comprises at least two outer intermediate ring contacts.

8. The data entry device according to claim 1 and wherein said contact portion of said resiliently deformable conductive element contacts said central contact when said housing is closed.

9. The data entry device according to claim 8 and wherein when said contact portion of said resiliently deformable conductive element contacts said central contact, said at least one intermediate ring contact is thereby electrically connected with said central contact.

10. The data entry device according to claim 1 and wherein said input to said tamper indication circuitry includes an indication of whether said deformable conductive element is simultaneously in contact with both said central contact and said at least one intermediate ring contact.

11. The data entry device according to claim 1 and wherein a separation between said contact portion of said resiliently deformable conductive element and said central contact is less than 0.1 mm.

12. The data entry device according to claim 1 and wherein a force required to establish electrical contact between said contact portion of said resiliently deformable conductive element and said central contact is approximately 200 grams.

13. The data entry device according to claim 1 and wherein said at least one intermediate ring contact comprises at least two intermediate ring contacts.

14. A case-open switch assembly for use with a two part housing, said two part housing having at least an open state and a closed state, the case-open switch assembly comprising:
an arrangement of electrical contacts arranged on a base surface in said housing, said arrangement of electrical contacts including an outer ring contact, at least one intermediate ring contact, and a central contact, at least one of said outer ring contact and said at least one intermediate ring contact being an anti-tampering contact; and
a resiliently deformable conductive element, which defines a short circuit between said central contact and said at least one intermediate ring contact only when said housing is closed,
said resiliently deformable conductive element comprising:
an at least partially continuous circumferential flange fixed in electrical contact with said at least one intermediate ring contact;
a circumferential portion having a cross sectional configuration which includes two mutually spaced arches;
a central portion disposed in a case-open operative orientation at a first distance from said base surface; and
a contact portion located interiorly of said central portion and disposed in a case-open operative orientation at a second distance from said base surface, less than said first distance, and in a non-case open operative orientation touching said central contact.

15. The case-open switch assembly according to claim 14 and wherein said at least one intermediate ring contact comprises an inner intermediate ring contact and at least one outer intermediate ring contact.

16. The case-open switch assembly according to claim 15 and wherein said at least one outer intermediate ring contact comprises at least two outer intermediate ring contacts.

17. The case-open switch assembly according to claim 14 and wherein said at least one intermediate ring contact comprises at least two intermediate ring contacts.

18. The case-open switch assembly according to claim 14 and wherein said arches of said circumferential portion are at least at a distance from said base surface which exceeds said first distance.

19. The case-open switch assembly according to claim 14 and wherein said central portion is generally flat.

* * * * *